United States Patent Office 3,301,483
Patented Jan. 31, 1967

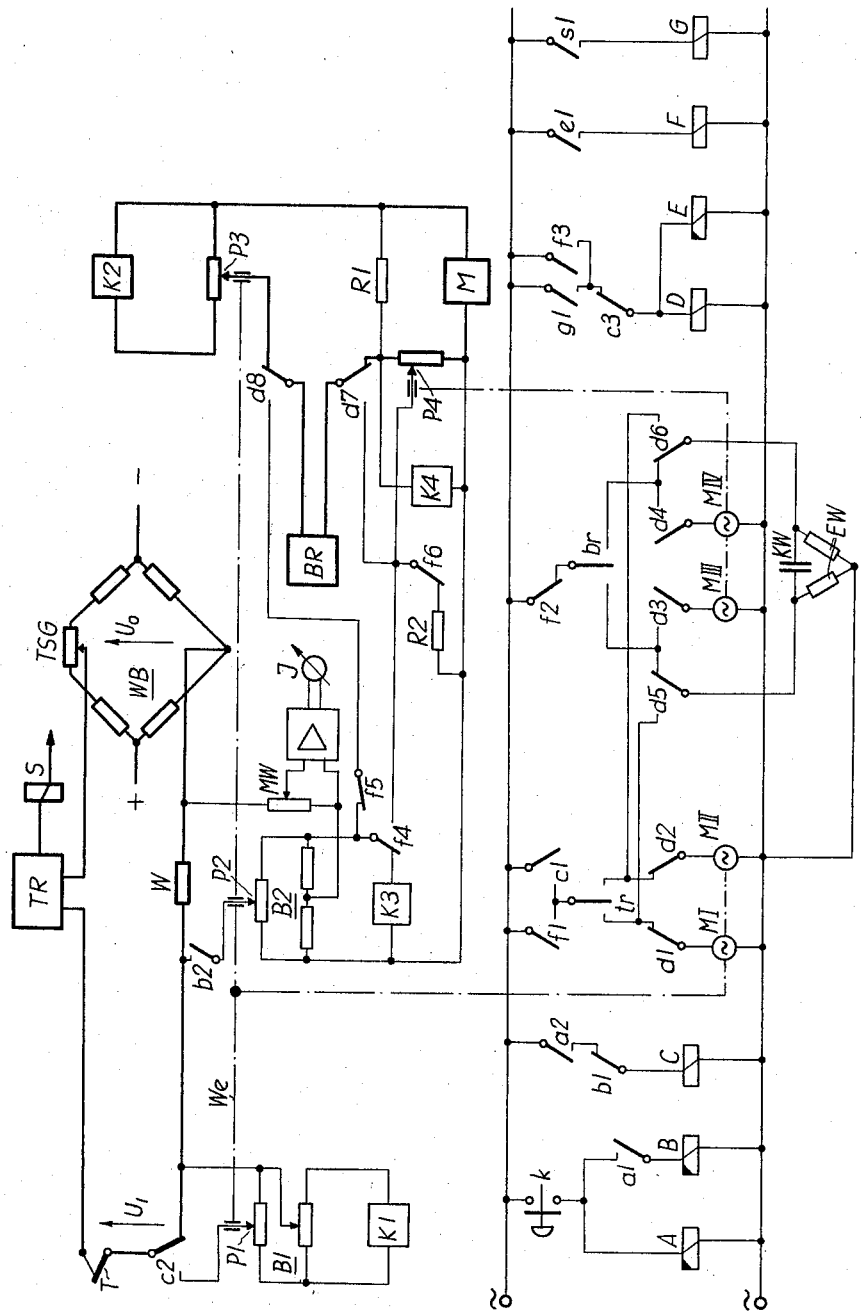

3,301,483
REGULATING DEVICE FOR FURNACES, PARTICULARLY ANNEALING FURNACES
Herbert Lang and Ferdinand Nierlich, Vienna, Austria, assignors to Wiener Schwachstromwerke Gesellschaft m.b.H., Vienna, Austria
Filed Apr. 28, 1964, Ser. No. 363,194
Claims priority, application Austria, May 10, 1963, A 3,790/63
9 Claims. (Cl. 236—78)

This invention relates to regulators for material heating apparatus, such as furnaces and particularly annealing furnaces, and more particularly to an improved regulator effective to maintain constant energy supply to material heating apparatus until a pre-set temperature value of the apparatus has been attained, with the magnitude of the energy supply being dependent upon the difference between the furnace temperature at the time of material introduction and such pre-set value.

In heat treatment operations, it is known to take into account the introduction temperature of the material to be heated by a furnace or the like. Generally the temperature of the material is measured directly, as is also the furnace temperature, and the energy supply to the furnace is selected correspondingly. Arrangements of this type are relatively complicated because of the additional temperature sensing means or temperature feelers that must be provided for the material to be heated and, in addition, they do not always assure an optimum adjustment of the energy supply.

It has also been suggested to increase the pre-set temperature of the furnace by an amount above the desired final temperature of the material proportional to the difference between the temperature at the introduction of the material and the desired final temperature. Thus, if a material at a lower temperature is introduced into the furnace, the energy supplied to the furnace has a magnitude greater than if the material being introduced were at a higher temperature. The desired final temperature of the material is obtained, in spite of the variation in the energy supply rate in accordance with the introduction temperature of the material since, after the higher pre-set temperature value has been attained, the furnace temperature is lowered to the desired final temperature of the material by adjusting the energy supply.

An object of the present invention is to provide a regulator for furnaces, such as annealing furnaces, for maintaining a constant energy supply until the furnace temperature equals a pre-set value selected in accordance with the temperature of the material introduced thereinto. The magnitude of the constant energy supply, or of the pre-set temperature value, is made dependent upon the difference between the furnace temperature at the time of the material introduction and a pre-set final temperature of the material.

Another object of the invention is to provide such a regulator which, after attainment of a desired temperature value, will regulate the energy supply to the furnace in accordance with differences between the temperature of the furnace and the desired final value of the temperature of the material.

A further object of the invention is to provide such a regulator which will take into account the introduction temperature of the material without the use of additional temperature sensing means and in a simple manner.

Still another object of the invention is to provide a regulator including adjustment means for varying at least one pre-set temperature value by an amount which depends upon the difference between the introduction temperature of the material and a second pre-set temperature value.

Still a further object of the invention is to provide such a regulator including such an adjusting device which is operated temporarily at the start of the heating process to provide a compensation value, effective at the regulator input, and which is proportional to the difference between the introduction temperature of the material and a pre-set temperature value.

Yet another object of the invention is to provide such a regulator in which variation of a pre-set temperature value is effected by superimposing an interference value, but including means for transferring regulation of the energy supply to temperature responsive means after a pre-set temperature value has been attained.

An ancillary object of the invention is to reduce the fuel supply automatically after a pre-set temperature value has been attained and also to reduce the temperature value, as increased by the interference value, to the desired final temperature of the material in the furnace.

For an understanding of the principles of the invention, reference is made to the following description of a typical embodiment thereof as illustrated in the accompanying drawing. In the drawing, the single figure is a schematic wiring diagram of a furnace regulator embodying the invention.

Referring to the drawing, closing of the charging door of the furnace, after introduction of material thereinto, closes a switch $k$. Closure of switch $k$ transfers a time delay relay A which, after a pre-set time delay, transfers its contact $a1$ to energize or pick up relay B which also is a time delay relay. A third relay C is provided and its transfer is controlled by a back contact $b1$ of relay B and a front contact $a2$ of relay A. With the described arrangement, it will be apparent that relay C will be energized or transferred only during the time intervals between closure of contact $a2$ following delayed transfer of relay A, and opening of contact $b1$ following delayed transfer of relay B, and that relay C will be dropped or de-energized following transfer of relay B. The relays A, B, and C thus act as a timing means to determine a time period which is adjustable by the adjustment of the delay times of relays A and B.

A temperature sensing means, such as a thermocouple T, is connected, in series with the input of a temperature regulator TR, in the diagonal of a resistance bridge WB. Resistance bridge WB includes an adjustable resistance TSG which can be used to pre-set a first temperature value for temperature regulator TR. The voltage $U_0$ across the diagonal of bridge WB opposes the voltage $U_1$ of thermocouple T.

Temperature regulator TR includes a pulse contact $tr$ whose ratio of pulse width to pulse interval is dependent upon the magnitude of the input voltage to regulator TR. Pulse contact $tr$ is a make and break contact whose direction of operation is dependent upon the sign or polarity of the input voltage to regulator TR. During the intervals between pulses, contact $tr$ remains in a neutral position. The pivot of contact $tr$ has an A.C. potential supplied thereto, during transfer of relay C, by relay contact $c1$. This latter contact is connected in parallel with a contact $f1$ of a relay F discussed more fully hereinafter.

Through the back contacts $d1$ and $d2$ of a relay D, pulse contact $tr$ controls one of two servomotors MI and MII, depending upon the net direction of the input voltage to regulator TR. The servomotors have respective opposite directions of rotation and are energized, due to the current pulses supplied thereto by pulse contact $tr$, with an average velocity which is proportional to the pulse frequency and thus to the magnitude of the input voltage of regulator TR. The servomotors MI and MII drive an adjusting device controlling a temperature value or signal and the energy supply which, in the illustrated embodiment of the invention, is a fuel supply. However, it should be understood that the energy supply may be electrical, steam, or any other suitable energy supply.

This adjusting device comprises three potentiometers P1, P2 and P3 whose adjustable taps or contacts are fixedly connected with a common shaft W$e$ of motors MI and MII, shaft W$e$ being indicated by a dot and dash line. Potentiometer P1 forms part of a bridge B1 to which is connected a constant current source K1. The voltage across the diagonal of bridge B1 is proportional to the angular adjustment of shaft W$e$ effected by motors MI or motor MII. The diagonal voltage of bridge B1 is supplied to the input circuit of regulator TR in a manner to compensate or buck the differential voltage between the voltage $U_0$ across the diagonal of resistance bridge WB and the voltage $U_1$ of thermocouple T. It will be noted that the voltage across the diagonal of bridge B1 is supplied to regulator TR only when contact $c2$ of relay C is transferred.

Pulsing contact $tr$, by operating one or the other of the servomotors MI and MII, adjusts potentiometer P1 at a rate, determined by the magnitude of the input voltage to regulator TR, until the voltage supplied by bridge B1 equals the difference between voltage $U_0$ and voltage $U_1$. If the temperance difference resulting in the voltage difference has a large magnitude, as when the introduced material is relatively cold, the time of operation of the motors MI or MII is longer and their angular movement is therefore greater than with smaller temperature differences. The time during which relay C remains energized or transferred is so selected that, even with the largest voltage difference, such difference can still be compensated during the time relay C remains transferred. After relay C has been dropped, by transfer of relay B, the shaft W$e$ occupies an angular position which corresponds to the difference between the furnace temperature at the start of the compensation operation and the desired temperature value.

The fuel supply to the furnace is regulated by a fuel regulator BR having a pulse contact $br$ whose ratio of pulse width to pulse intervals is dependent upon the input voltage to regulator BR. Pulse contact $br$ is, similarly to contact $tr$, a make and break contact with its direction of operation being dependent upon the sign of the input voltage to regulator BR. During the intervals between pulses, contact $br$ remains in a neutral position.

Contact $br$ has an A.C. potential applied thereto over contact $f2$ and, through reversing contact $d3$ and $d4$ of relay D, energizes one or the other of a pair of servomotors MIII or MIV which have opposed directions of operation. These last mentioned servomotors are connected to suitable gearing for controlling the adjustment of a potentiometer P4.

A capacitor type reversible motor having energizing windings EW is provided for controlling a fuel supply adjusting member, and this motor includes an exciter capacitor KW. Through the medium of contacts $d5$ and $d6$ of relay D, this motor can be connected either to pulsing contact $br$ or pulsing contact $tr$, the contacts $d5$ and $d6$ being reversing contacts. Depending upon the position of the contacts $d5$ and $d6$, either one or the other of the two energizing windings EW of the motor acts as a main winding, with the other winding supplied with a phase-shifted current by the capacitor so as to act as an auxiliary phase winding. The armature of the motor, which has not been shown, is thus operated in opposite directions depending upon the direction of operation of the pulsing contacts $br$ or $tr$ to correspondingly either increase or decrease the fuel supply.

A fuel flowmeter M is provided to measure the fuel supply, and has an output signal current proportional to the fuel supply rate. Potentiometer P4 and an auxiliary resistance R1 are connected in circuit with flowmeter M so that a voltage appears across resistance R1 which is proportional to the rate of fuel supply. A constant current source K4 is connected in parallel with potentiometer P4. In conjunction with potentiometer P3, which is supplied from a constant current source K2, auxiliary resistance R1 forms a voltage comparison circuit. The voltage differential between the voltage across potentiometer P3 and that across auxiliary resistance R1 is applied to the input of fuel regulator BR through contacts $d7$ and $d8$ which are reversible contacts.

A resistance W is connected in the temperature measuring circuit of temperature regulator TR, and is arranged to be connected in the diagonal of a resistance bridge B2 upon transfer of a contact $b2$ of relay B. Two branches of bridge B2 are formed by fixed resistances and the other two by potentiometer P2 whose tap is in the diagonal of the bridge along with contact $b2$, resistance W and a measuring point resistance MW. Upon transfer of contact $b2$, potentiometer P2, resistance W, and measuring point resistance MW are connected as the diagonal of bridge B2. The voltage across the bridge B2 is supplied from a constant current source K3 which can be connected to bridge B2 by a contact $f4$. An amplifier is connected across the measuring point resistance MW and supplies an indicating instrument J so that the interference temperature value, in degrees C. of excess temperature, is indicated by instrument J, whereby the regulating process may be observed.

Relays D and E can be transferred through a contact C3 upon operation of either one of a pair of contacts $g1$ and $f3$. Relay E is a delayed transfer relay and has a contact $e1$ which, when transferred, transfers a relay F. A relay S is connected to temperature regulator TR and is transferred as soon as the temperature, pre-set by adjustment of resistance TSG and augmented by the increment due to the drop across resistance W, is attained. This relay has a contact $s1$ which is positioned in the energizing circuit of a relay G, so that relay G will be transferred responsive to transfer of relay S. The input circuit of fuel regulator BR can be connected, through three contacts $f4$, $f5$, and $f6$, and by means of reversing contacts $d7$ and $d8$ to constant current source K3 and to potentiometer P4, a resistance R2 being included in these connections.

With reference to the foregoing description, the regulator of the invention operates in the following manner. When contact $k$ is closed at the start of an operation, as by closing of the charging door of an annealing furnace, relay C is transferred as described during a time interval determined by the successive transfer of relays A and B. Shaft W$e$ is meanwhile adjusted by one or the other of the motors MI and MII until its angular position corresponds to the deviation of the initial furnace temperature from the first value pre-set by setting means TSG. This is effected as follows. Potentiometer P1, which is connected to the input circuit of regulator TR by transfer of contact $c2$, supplies a compensation voltage into the temperature measuring circuit of thermocouple T. This compensation voltage varies in accordance with the adjustment of shaft W$e$ in a direction to oppose the differential between voltages $U_0$ and $U_1$. After the compensation voltage of potentiometer P1 equals the difference between voltages $U_0$ and $U_1$, relay C is de-energized as relay contact $b1$ is transferred by delayed transfer of relay B. The dropping of contact $c1$ interrupts the supply circuit for motors MI and MII to prevent further changes in the angular position of shaft W$e$ and of the settings of potentiometers P1, P2 and P3 adjusted by this shaft.

Potentiometer P2 is adjusted simultaneously with potentiometer P1 during such initial compensation. Potentiometer P2 is arranged in bridge circuit B2 which then has the constant current source K3 connected thereacross. The adjusted value of the voltage of potentiometer P2 corresponds to the interference value necessary to be superimposed upon the compensated first temperature value.

When relay B transfers, the voltage of potentiometer P2 is applied, through contact b2, to resistance W so that the constant portion of the voltage at the input of regulator TR, which represents the first pre-set value, is increased by the "interference" value. Since relay C drops after completing of the compensation, to open contact c1, any pulsing of temperature regulator contact tr is now ineffective.

Potentiometer P3, which has also been set during such initial compensation, derives, from the constant current source K2, a voltage which is compared, in the voltage comparison circuit, with the voltage of fuel flowmeter M appearing across the resistance R1. The resulting voltage difference is applied to the input of fuel regulator BR through contact d7 and d8. As mentioned, fuel regulator BR controls, through its pulsing contact br, one or the other of the exciter windings EW to operate the fuel adjusting means until the voltage supplied by flowmeter M equals the voltage across potentiometer P3. The magnitude of the fuel supply is thus correlated with the value determined by the compensation process.

When the initially adjusted higher temperature value is attained, relay S transfers to transfer relay G through contact s1. Transfer of relay G transfers relays D and E, through contacts g1, with relay E being, as stated, a delayed transfer relay. As a result of the reversal of contacts d7 and d8, fuel regulator BR, through contacts f4, f5, and f6, is so connected that the difference between the voltage derived from constant current source K3 and the voltage across potentiometer P4 is applied to the input of fuel regulator BR. The comparison voltage for the voltage of potentiometer P4 is now that of fuel flowmeter M. The compensating means is now comprising the motors MIII and MIV is now controlled by pulse contact br over contacts d3 and d4, due to transfer of relay D. Potentiometer P4 is now so adjusted that the voltage drop thereacross equals that of the constant current source K3.

The aforementioned compensation is effected during a time interval determined by the delayed transfer time of relay E. When relay E transfers, at the end of its delay time, and after transfer of contact g1, the transfer of relay F is effected through closure of contact e1. When relay F transfers, transfer of its contact f2 interrupts the supply of potential to pulsing contact br of fuel regulator BR. Also, transfer of contact f6 disconnects the resistance R2 from the input circuit of fuel regulator BR and bridge B2 is connected to potentiometer P4 by transfer of contacts f4. Transfer of contact f1 connects pulsing contact tr of temperature regulator TR through transferred contacts d5 and d6 to the exciter windings EW of the motor controlling the fuel adjusting means. In correspondence with the reduced heat requirements, temperature regulator BR now reduces the rate of fuel supply. With reduction in the rate of fuel supply, the voltage across the potentiometer P4 also decreases. This voltage is now the voltage applied to bridge B2, which latter is the means for the super-imposition of the interference value which is the temperature increase value above the pre-set temperature value. Thus, the value of the interference voltage is reduced in accordance with the decreasing fuel supply.

Since the supply of fuel is not reduced to zero, and only that amount which corresponds to the power loss of the furnace is regulated, the interference value, and the increase above the first pre-set value, are decreased towards zero when the fuel supply is reduced minimum value. To effect this, a cut-off voltage is supplied, from source K4, into the voltage comparison circuit of fuel flowmeter M.

While a specific embodiment of the invention has been shown and described in detail to illustrate the application of the principles of the invention, it will be understood that the invention may be embodied otherwise without departing from such principles.

What is claimed is:

1. A regulator for material heating apparatus comprising, in combination, circuit means providing a first control signal proportional to the difference between the temperature of the apparatus and a first pre-set temperature; a resistance included in said circuit means; a bridge circuit including a potentiometer; means operable, during a limited time period following introduction of material into said apparatus, to measure the difference between the furnace temperature at the introduction of such material and said first pre-set value, and to adjust the potentiometer in accordance with such difference; said resistance being connected in the diagonal of said bridge circuit whereby a voltage drop is applied across said resistance, proportional to such difference, to add a second signal, proportional to such difference, to said first control signal in such circuit means to provide a third control signal proportional to the difference between the temperature of the apparatus and a second temperature higher than said first pre-set temperautre; means operable responsive to said third signal to maintain a constant supply of energy to said apparatus until said second temperature is attained; a source of constant current; means operable, during attainment of said second temperature, to connect said source of constant current in supply relation with said bridge circuit; means operable, responsive to attainment of said second temperature, to disconnect said source of constant current from said bridge circuit and to supply, to said bridge circuit, a current proportional to the rate of energy supply until such time as said first pre-set temperature is attained; an adjustable resistance connected in series with the first mentioned resistance; and an indicating means connected between a tap of said adjustable resistance and one end of the latter.

2. A regulator for material heating apparatus comprising, in combination, circuit means providing a first control signal proportional to the difference between the temperature of the apparatus and a first pre-set temperature, said circuit means including a temperature regulator, a temperature sensitive element, and a temperature setting resistance, the voltages across the temperature sensitive element and said temperature setting resistance being applied, in opposition, to the input of said temperature regulator; a bridge circuit including a first potentiometer; a source of constant current connected in supply relation with said bridge circuit; adjusting means for said first potentiometer; means operable, during a limited time period following introduction of material into said apparatus, to connect said first potentiometer to said circuit means in opposition to the voltage difference between said temperature sensitive element and said temperature setting resistance, and to connect the output of said temperature regulator to said adjusting means to adjust said first potentiometer to a setting corresponding to the difference between the temperature of the furnace at the introduction of material thereinto and said pre-set temperature; means operable by said adjusting means to provide a second control signal proportional to such difference between the furnace temperature at the introduction of material thereinto and said first pre-set temperature; means operable to add said second control signal to said first control signal in said circuit means to provide a third control signal proportional to the difference between the temperature of the apparatus and the second temperature higher than first pre-set temperature; and means operable, responsive to said third control signal, to maintain a constant supply of energy to said apparatus until said second temperature is attained; said means operable to connect said first potentiometer to said circuit means comprising a first delay relay energized responsive to introduction of material into said apparatus; a second delay relay energized responsive to delayed transfer of said first delay relay; and a third relay energized upon transfer of said first relay and de-energized upon transfer of said second delay relay, said third relay including a contact operable, upon transfer of said third relay, to connect said potentiometer to said circuit means.

3. A regulator for material heating apparatus, as claimed in claim 2, including a charging door for said apparatus; and a switch in the energizing circuit of said first delay relay closed upon closing of said charging door.

4. A regulator for material heating apparatus comprising, in combination, circuit means providing a first control signal proportional to the difference between the temperature of the apparatus and a first pre-set temperature; means operable, during a limited time period following introduction of material into said apparatus, to measure the difference between the furnace temperature at the introduction of material thereinto and said first pre-set temperature to provide a second control signal proportional to such difference; a first potentiometer; a source of constant current across said first potentiometer; means operable, during measurement of such temperature difference, to adjust said first potentiometer in accordance with such difference; means operable to add said second control signal to said first control signal in said circuit means to provide a third control signal proportional to the difference between the temperature of the apparatus and a second temperature higher than said first temperature; an energy regulator connected in circuit with said first potentiometer and adjustable in accordance with the setting of said first potentiometer to control the supply of energy to said apparatus at a constant rate until said second temperature is attained; a resistance connected in circuit with said energy regulator and said first potentiometer; and an energy supply rate measuring means effective to apply a voltage across said resistance proportional to the rate of energy supply to said apparatus; whereby to apply, to said energy regulator, a control signal portional to the difference between the tapped voltage of said first potentiometer and the voltage drop across said resistance.

5. A regulator for material heating apparatus, as claimed in claim 4, including a reversible motor controlling energy supply adjusting means; a source of potential for said motor; and means, including the output signal of said energy regulator, controlling application of potential to said reversible motor to adjust the energy supply rate in a direction to balance the voltage drop across said resistance and the voltage tapped by said first potentiometer to null the input to said energy regulator.

6. A regulator for material heating apparatus, as claimed in claim 5, including a temperature regulator in said circuit means providing an output responsive to the difference between the temperature of the apparatus and said second temperature; first adjustment means included in said temperature difference measuring means and effective to adjust said first potentiometer; switch means effective to apply the output signal of said temperature regulator to said first adjusting means during such limited time period; relay means operable by said temperature regulator responsive to attainment of said second temperature to discontinue control of said reversible motor by the output signal of said energy regulator and to control said reversible motor by the output signal of said temperature regulator, and being further operable to disconnect said first adjusting means; a second potentiometer in circuit connection with said energy rate measuring means and said resistance; a second adjustment means operable to adjust said second potentiometer; said relay means when transferred, establishing control of said second adjusting means by the output signal of said energy regulator, and connecting said energy regulator to said second potentiometer; whereby to adjust the voltage tapped from said second potentiometer in a direction to operate said fuel regulator to reduce the energy supply to reduce the furnace temperature to said first pre-set value.

7. A regulator for material heating apparatus, as claimed in claim 6, including a source of constant current connected across said second potentiometer.

8. A regulator for material heating apparatus, as claimed in claim 6, in which the means operable to add said second signal to said first control signal includes a bridge circuit having a third potentiometer included therein; switch means connecting a source of constant current across said bridge circuit; a resistance included in said circuit means and further included in the diagonal of said bridge circuit; said first potentiometer and said third potentiometer being conjointly adjustable during measurement of the temperature difference during such limited time period; said relay means, upon transfer, operating said switch means to disconnect said last-named source of constant current from said bridge circuit and to connect said bridge circuit to said second potentiometer.

9. A regulator for material heating apparatus, as claimed in claim 8, including further switch means, operable responsive to transfer of said relay means, to disconnect said energy regulator from said first potentiometer and from said first mentioned resistance, and to connect said energy regulator to said bridge circuit.

References Cited by the Examiner

UNITED STATES PATENTS

| 2,842,311 | 7/1958 | Petrie | 236—15 |
| 2,874,906 | 2/1959 | Nossen | 236—15 |
| 3,069,087 | 12/1962 | Thomas | 236—15 |

OTHER REFERENCES

G. H. Amber et al., Special Purpose Computers in the Control of Continuous Processes. In Automatic Control 8(5), p. 43–47, May 1958.

ALDEN D. STEWART, *Primary Examiner.*